UNITED STATES PATENT OFFICE.

VICTOR RAISIN, OF PARIS, FRANCE, ASSIGNOR TO SOCIÉTÉ COMPAGNIE INDUSTRIELLE DES ALCOOLS DE L'ARDECHE, OF PARIS, FRANCE.

ABSORBENT PRODUCT.

1,021,477.  Specification of Letters Patent.  Patented Mar. 26, 1912.

No Drawing.  Application filed May 19, 1909. Serial No. 497,105.

*To all whom it may concern:*

Be it known that I, VICTOR RAISIN, a citizen of the Republic of France, and resident of Paris, France, have invented a new and useful Improvement in Absorbent Products, which improvement is fully set forth in the following specification.

This invention relates to an absorbing product intended to be mixed with viscous matters, such for instance as molasses and similar materials, so as to obtain a non-viscous product that can be easily manipulated.

When saw dust or finely divided wood is treated by the well known process a description of which may be found, for example, in British patent to Zimmerman, No. 27,549 of 1907, by means of sulfurous acid under pressure, in the presence of heat, a portion of the cellulose, as well as the tannic acid of the wood, are transformed into sugar which is recuperated by submitting the whole mass to a prolonged washing. The results of that operation are, on the one hand a solution of sugar, and on the other hand, as a residue, the deincrusted portion of the cellulose of the saw dust which had not been attacked and which is freed from sugar and tannic acid, and is in a porous condition due to the deincrustation process, whereby the incrusting mineral matters have been eliminated. The said residue is subsequently submitted to a suitable drying by compression, by means of hydroextractors or by heat, so that its proportion of moisture should be for instance less than 20%. The product is then ready to be used as an absorbent. For utilizing the product in question, it is mixed with the material which it is desired that it should absorb, for instance with molasses. The final product is a pulverulent or powder shaped mass which can be placed into sacks and kept in the shape of powder or compressed into cakes. The remaining cellulose of the saw dust, which has been freed from sugar or acids, simply plays the mechanical part of an absorbent. The mixture has all the chemical properties of the material absorbed by the saw dust, while being in the dry shape and perfectly easy to manipulate. Saw dust thus treated could be made to absorb up to 70 parts of molasses for 30 parts of saw dust, without its losing its property of being made into cakes or placed into sacks.

This product has the advantage of enabling molasses and similar viscous materials, after they have been mixed, to be easily transported and manipulated. In that way, the sometimes considerable waste due to the adhesion of the said viscous materials to the walls of the vessels containing the same, is avoided. The materials thus absorbed can also be preserved for a long time, and then recovered at any desired moment by means of a suitable process. For example, the absorbent product may be used for absorbing distillers' wash to render the latter easily stored or shipped. When it is desired to extract the glycerin which is contained in the distillers' wash, the latter is dissolved out of the absorbent product by means of suitable solvents. The wash may then be treated for the recovery of the glycerin.

The use of this product is more particularly advantageous for obtaining preservation of the products intended to be distilled and which have to be stored for some time. This product complies thus with the conditions required for producing a good fodder with molasses.

In certain cases the above product could be utilized as an absorbent without being submitted to a previous washing. A good forage could be made by mixing 25 parts of the absorbent product with 75 parts of molasses thus obtaining a mixture which could be immediately manipulated if the molasses contained—as is usual—about 40 to 50 per cent. of sugar. Its applications are numerous. The absorbent product could be for instance mixed with concentrated "vinasses" or distillers' wash obtained by the distillation of beet root, molasses or grain, in order to render the said vinasses easy to manipulate and to bring them into such state as to enable them to be chemically treated.

Claims:

1. The herein described material comprising the deincrusted porous cellulose residue of the wood-sugar process, dehydrated to a less than 20% moisture content.

2. The herein described material comprising the deincrusted porous cellulose residue of the wood-sugar process washed and dehydrated to a less than 20% moisture content.

3. The combination of a deincrusted porous cellulose residue of the wood-sugar process, washed and dehydrated to a less than 20% moisture content, with distillers' wash.

In testimony whereof I have signed this specification in the presence of two subscribing witnesses

VICTOR RAISIN.

Witnesses:
 EMILE LEDRET,
 DEAN B. MASON.